(12) United States Patent
Choi et al.

(10) Patent No.: US 11,512,227 B2
(45) Date of Patent: Nov. 29, 2022

(54) ADHESIVE SHEET AND ADHESIVE MATERIAL USING THE SAME

(71) Applicant: LMS Co., Ltd., Pyeongtaek-si (KR)

(72) Inventors: Junsik Choi, Pyeongtaek-si (KR);
Jinseok Yeom, Pyeongtaek-si (KR);
Woongki Lee, Pyeongtaek-si (KR);
Hoseong Na, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 407 days.

(21) Appl. No.: 16/692,056

(22) Filed: Nov. 22, 2019

(65) Prior Publication Data
US 2020/0165492 A1 May 28, 2020

(30) Foreign Application Priority Data
Nov. 23, 2018 (KR) .................. 10-2018-0146005

(51) Int. Cl.
*C09J 7/10* (2018.01)
*C09J 7/38* (2018.01)
(Continued)

(52) U.S. Cl.
CPC .............. *C09J 7/10* (2018.01); *C08F 220/18* (2013.01); *C08F 220/28* (2013.01); *C08F 220/30* (2013.01); *C08F 220/56* (2013.01); *C08F 236/02* (2013.01); *C08F 236/22* (2013.01); *C08J 3/28* (2013.01); *C08K 5/005* (2013.01); *C08K 5/0025* (2013.01); *C08K 5/07* (2013.01); *C08K 5/3475* (2013.01);
(Continued)

(58) Field of Classification Search
CPC . C09J 2433/00; C09J 7/10; C09J 7/385; C09J 2203/326; C09J 2301/312; C09J 133/06; C09J 133/066; C09J 9/00; C09J 7/00; C09J 11/06; C09J 133/08; C09J 133/10; C08F 220/18; C08F 220/28; C08F 220/30; C08F 220/56; C08F 236/02; C08F 236/22; C08F 220/1804; C08F 220/1806; C08F 220/1808; C08F 220/1811; C08J 3/28; C08K 5/0025; C08K 5/005; C08K 5/07; C08K 5/3475; C08K 5/3492; C08K 5/5397; C08K 5/5419; C08K 5/5435
See application file for complete search history.

(56) References Cited

U.S. PATENT DOCUMENTS 6,416,858 B1 * 7/2002 Ercillo ................ B32B 37/1284
428/355 AC
2007/0190871 A1 * 8/2007 Patel ..................... B32B 25/02
442/40
(Continued)

FOREIGN PATENT DOCUMENTS

EP 134025 B * 6/1988 ........... C08K 5/3492
KR 2016117273 A * 10/2016 ............... C09J 11/06

OTHER PUBLICATIONS

Machine Translation of KR-2016-117273A (Year: 2016).*

*Primary Examiner* — Scott R. Walshon
(74) *Attorney, Agent, or Firm* — Polsinelli PC

(57) ABSTRACT

An adhesive sheet utilizes an acrylic resin composition without using a separate primer layer, thus providing excellent adhesion, high reliability due to its excellent light resistance under the sunlight exposure, and excellent elastic modulus, and can be easily used as an adhesive material in various fields such as building materials and automobiles.

17 Claims, 1 Drawing Sheet

(51) Int. Cl.
*C08F 220/18* (2006.01)
*C08F 220/28* (2006.01)
*C08K 5/07* (2006.01)
*C08K 5/5397* (2006.01)
*C08K 5/00* (2006.01)
*C08K 5/3492* (2006.01)
*C08K 5/3475* (2006.01)
*C08F 220/56* (2006.01)
*C08F 220/30* (2006.01)
*C08K 5/5419* (2006.01)
*C08K 5/5435* (2006.01)
*C08F 236/02* (2006.01)
*C08F 236/22* (2006.01)
*C08J 3/28* (2006.01)

(52) U.S. Cl.
CPC .......... *C08K 5/3492* (2013.01); *C08K 5/5397* (2013.01); *C08K 5/5419* (2013.01); *C08K 5/5435* (2013.01); *C09J 7/385* (2018.01); *C08F 220/1804* (2020.02); *C08F 220/1806* (2020.02); *C08F 220/1808* (2020.02); *C08F 220/1811* (2020.02); *C09J 2203/326* (2013.01); *C09J 2301/312* (2020.08)

(56) References Cited

U.S. PATENT DOCUMENTS

2016/0186019 A1* 6/2016 Negri .................... E04F 13/042
  52/745.09
2016/0272848 A1* 9/2016 Suzuki ....................... C09J 7/10
2017/0198177 A1* 7/2017 Olson ................... H01L 31/048

\* cited by examiner

ADHESIVE SHEET AND ADHESIVE MATERIAL USING THE SAME

CROSS REFERENCE TO RELATED APPLICATION

This application claims priority under 35 U.S.C. 119 to Korean Patent Application No. 10-2018-0146005, filed on Nov. 23, 2018, which is hereby incorporated by reference in its entirety.

BACKGROUND

Technical Field

The present invention relates to an adhesive sheet including an adhesive material.

Description of Related Art

As various products became electronic products for the IT applications, they have begun to affect the automobile industry, and since electric cars and hybrid cars start being widely used, the trend for making those cars is growing around three keywords: safety, convenience, and eco-friendliness.

In general, since most of the electric/electronic parts used in automobiles are impossible to weld, they are fixed/attached using adhesives or adhesive sheets. Conventionally, adhesives used in automobiles include epoxy, urethane, polyisobutylene (PIB), and paraxylene, etc., and the application method is generally gluing, sealing, coating, and molding, etc. Epoxy is used to bond various substrates and is cured at the room temperature or accelerated cured at the heating condition. Epoxy, however, generally has limitation for a long-term use at the high temperature. Epoxy is also opaque and resistant to wear, moisture, and chemicals, but like other hard coatings, it does not absorb the stress resulting from the different degree of thermal expansion between components, circuits, and substrates, but even rather increases the stress at the extreme temperature or thermal cycles. In addition, urethane is able to adhere to a variety of substrates and has a wide range of elastic modulus after curing, but when the urethane is used for metal adhesion, often primers are required to be applied for the adhesion. As a result, the urethane is limitedly used because it is less stable under the high humid condition. Moreover, for polyisobutylene, like the urethane, it adheres to various substrates after curing and has a wide range of elastic modulus, but is less stable for solvents, oils, fuels, and chemicals. For para-xylene, it is advantageous to be used for conformal coating because it maintains a constant coating thickness and has good permeability to complex structures. However, its application is limited because it has relatively high price and high sensitivity to contamination and also is to crack due to vibration thereby required to be used under the vacuum condition.

Therefore, there is a demand for the development of a high-performance adhesive material for the adhesion which is economical as well as provides excellent adhesion and elastic modulus characteristics.

SUMMARY

The object of the present invention is to provide a high performance adhesive material with an excellent adhesion and elastic modulus characteristics.

The object of the present invention is to provide an adhesive sheet comprising an adhesive layer formed of a resin composition and a loss elastic modulus of the adhesive sheet satisfying Equation 1: $|\log LM_{-10°\,C.} - \log LM_{0°\,C.}| \leq 0.600$ wherein a log $LM_{-10°\,C.}$ is a log value of said loss elastic modulus measured at a rate of 5° C./min of under a condition of −10° C. 1 Hz, and 1% strain, and a log $LM_{0°\,C.}$ is a log value of said loss elastic modulus measured at a rate of 5° C./min under a condition of at 0° C. 1 Hz and 1% strain.

Accordingly, another object of the present invention is to provide the adhesive sheet, wherein an average light transmittance of a light transmitting through the adhesive sheet is 10% or less, and wherein a range of a wavelength of the light is 300 nm to 400 nm.

Accordingly, another object of the present invention is to provide the adhesive sheet, wherein the loss elastic modulus is 0.25 MPa to 0.65 MPa measured at 25° C. and 1 Hz.

Accordingly, another object of the present invention is to provide the adhesive sheet, wherein the resin composition includes: 100 parts by weight of an alkyl (meth) acrylate having a straight or a branched chain alkyl group having 1 to 10 carbon atoms; 45 to 90 parts by weight of hydroxyl-containing monomers; 45 to 110 parts by weight of aliphatic saturated hydrocarbon ring-containing monomer having 4 to 20 carbon atoms; 10 to 50 parts by weight of a UV absorber; and 5 parts by weight or less of a photo polymerization initiator.

Accordingly, still another object of the present invention is to provide the adhesive sheet, wherein the alkyl (meth) acrylates has one or more elements selected from a group including n-butyl acrylate, iso-butyl acrylate, pentyl acrylate, hexyl acrylate, 2-ethylhexyl acrylate (2-EHA), iso-octyl acrylate, n-nonyl (meth) acrylate, iso-nonyl acrylate, n-decyl (meth) acrylate and iso-decyl (meth) acrylate.

Accordingly, still another object of the present invention is to provide the adhesive sheet, wherein the hydroxyl-containing monomers has one or more elements selected from a group including 2-hydroxyethyl (meth) acrylate (2-HEA), 2-hydroxypropyl (meth) acrylate, 4-hydroxybutyl (meth) acrylate, 6-hydroxyhexyl (meth) acrylate, 8-hydroxyoctyl (meth) acrylate, 2-hydroxyethylene glycol (meth) acrylate and 2-hydroxypropylene glycol (meth) acrylate.

Accordingly, still another object of the present invention is to provide the adhesive sheet, wherein the aliphatic saturated hydrocarbon ring-containing monomer has one or more elements selected from a group including isobornyl (meth) acrylate, cyclohexyl (meth) acrylate, norbornanyl (meth) acrylate, norbornenyl (meth) acrylate, dicyclo pentadienyl (meth) acrylate, ethynylcyclohexane (meth) acrylate, and ethynylcyclohexene (meth) acrylate.

Accordingly, still another object of the present invention is to provide the adhesive sheet, wherein the photo polymerization initiator has one or more elements selected from a group including 1-hydroxy cyclohexyl phenylketone, 2,2-dimethoxy-2-phenyl acetophenone, 2-hydroxy-2-methyl-1-phenyl-propan-1-one, a 2-methyl-1-[4-(Methylthio) phenyl]-2-morpholinopropane-1-one, 2-benzyl-2-dimethylamino-1-(4-morpholinophenyl)-butan-1-one, 2-chlorothioxanthone, 2,4-dimethylthioxanthone, 2,4-diisopropylthioxanthone, an isopropyl thioxanthone, 2,4,6-trimethylbenzoyl diphosphine oxide and bis ((2,6-dimethoxybenzoyl)-2,4,4-trimethylpentyl) phosphine oxide.

Accordingly, still another object of the present invention is to provide the adhesive sheet, wherein the UV absorber has some or more elements selected from a group including benzophenone compound, oxalanilide compound, benzotriazole compound and triazine compound.

Accordingly, still another object of the present invention is to provide the adhesive sheet, wherein the resin composition has one or more elements selected from a group including amide containing monomer and aromatic ring containing monomer.

Accordingly, yet still another object of the present invention is to provide the adhesive sheet, wherein the content of the amide-containing monomer or the aromatic ring-containing monomer being 1 to 50 parts by weight based on 100 parts by weight of the alkyl (meth) acrylate.

Accordingly, yet still another object of the present invention is to provide the adhesive sheet, wherein the amide containing monomer has one or more elements selected from a group including N, N-dimethylacrylamide, N, N-diethylacrylamide, and N, N-dimethylmethacrylamide.

Accordingly, yet still another object of the present invention is to provide the adhesive sheet, wherein the aromatic ring containing monomer has one or more elements selected from a group including a phenoxyethyl (meth) acrylate, a benzyl (meth) acrylate, a phenoxydiethylene glycol (meth) acrylate, an ethylene oxide modified phenoxy nonyl (meth) acrylate, and an ethylene oxide (meth) acrylate modified cresol.

Accordingly, still another object of the present invention is to provide the adhesive sheet, wherein the composition has one or more of silane coupling agent and crosslinking agent.

Accordingly, yet still another object of the present invention is to provide the adhesive sheet, wherein the silane coupling agent has one or more elements selected from a group including with γ-glycidoxy propyltrimethoxysilane, γ-glycidoxy propyltriethoxysilane, γ-aminopropyltrimethoxysilane, and N-phenyl-aminopropyltrimethoxysilane.

Accordingly, yet still another object of the present invention is to provide the adhesive sheet, wherein the crosslinking agent has one or more multifunctional acrylate elements selected from a group including dipentaerythritol hexaacrylate, tetramethylolmethane tetraacrylate, tetramethylolmethane triacrylate, trimethanolpropane triacrylate, 1,6-bis (3-acryloyloxy-2-hydroxypropyloxy) hexane, poly (ethylene glycol) diacrylate (PEGDA) and pentaerythritol triacrylate.

Accordingly, another object of the present invention is to provide the adhesive sheet, wherein an average thickness of said adhesive sheet is 100 μm to 1 mm.

Accordingly, another object of the present invention is to provide the adhesive sheet, wherein a coordinate value of b* is 6 to 8 when a CIE color coordinate is measured.

DETAILED DESCRIPTION

Figure 1:
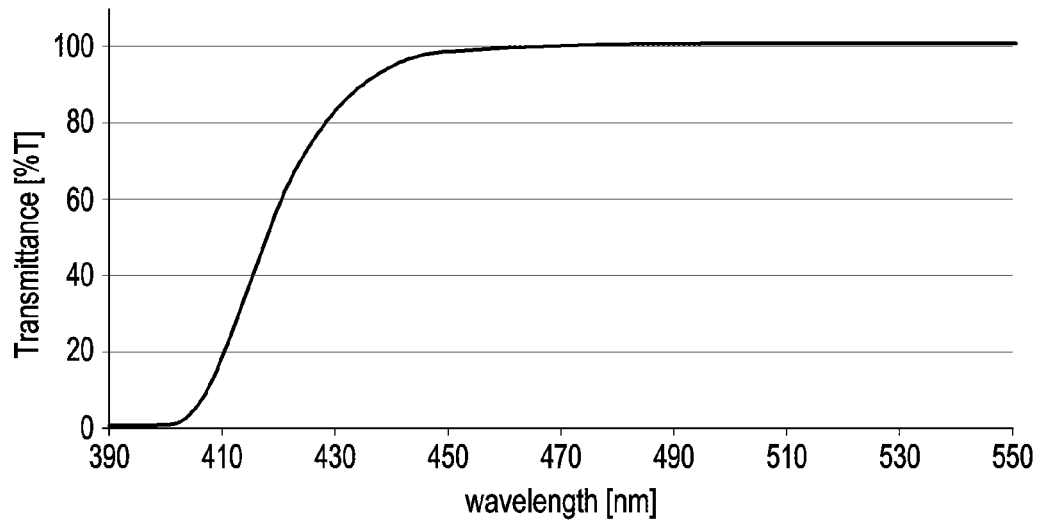
FIG. 1 is a graph showing the light transmittance according to the wavelength of the adhesive sheet prepared in Example 1.
Figure 2:
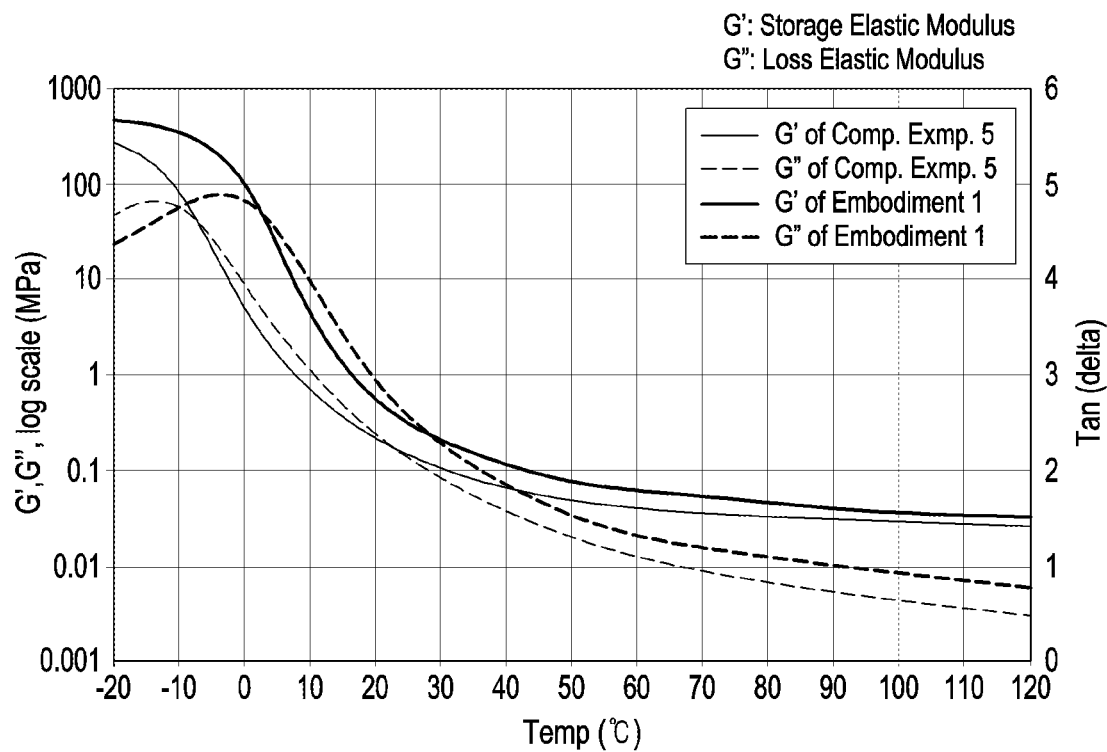
FIG. 2 is a graph showing log values of storage elastic modulus (G') and log values of loss elastic modulus (G) according to temperature of the adhesive sheet prepared in Example 1 and Comparative Example 5.

As the invention allows for various changes and numerous embodiments, particular embodiments will be illustrated in the drawings and described in detail in the written description.

However, this is not intended to limit the present invention to specific embodiments, it should be understood to include all modifications, equivalents, and substitutes included in the spirit and scope of the present invention.

In the present invention, the terms "comprises" or "having" are intended to indicate that there is a feature, number, step, operation, component, part, or combination described in the specification, and one or more other features. It is to be understood that the present disclosure does not exclude the possibility of the presence or the addition of numbers, steps, operations, components, components, or combinations.

In the present invention, "color coordinates" means coordinates in the CIE color space, which is a color value defined by the CIE (Commission International de l'Eclairage), and any position in the CIE color space can be expressed as three coordinate values, $L^*$, $a^*$, and $b^*$.

Here, a value, $L^*$ represents the brightness, and when $L^*=0$, black is displayed, and when $L^*=100$, white is displayed. In addition, a value, $a^*$ indicates that the color with the corresponding color coordinates is closer to either pure magenta or pure green, and a value, $b^*$ indicates that the color with the corresponding color coordinates is closer to either pure yellow or pure blue.

Specifically, the $a^*$ value has a range from $-a$ to $+a$, the maximum value of $a^*(a^*max)$ represents the pure magenta, and the minimum value of $a^*(a^*min)$ represents the pure green. For example, a negative $a^*$ value indicates a color closer to the pure green and a positive value means a color closer to the pure magenta. Comparing $a^*=80$ to $a^*=50$, it means that $a^*=80$ is closer to the pure magenta than $a^*=50$. In addition, the $b^*$ value has a range from $-b$ to $+b$. The maximum value of $b^*(b^*max)$ represents the pure yellow, and the minimum value of $b^*(b^*min)$ represents the pure blue. For example, a negative $b^*$ value means a color closer to the pure blue while a positive $b^*$ means a color closer to the pure yellow. Comparing $b^*=80$ and $b^*=20$, it means that $b^*=80$ is closer to the pure yellow than $b^*=20$.

Furthermore, in the present invention, the unit "T" is a unit for the thickness of the layer which comprises a film, a sheet, or a laminated film, and may be the same as the unit "mm".

Embodiments of the present invention relates to an adhesive sheet and an adhesive material including the adhesive sheet.

In recent years, as various products became electronic products for the IT applications, they have begun to affect the automobile industry, and since electric cars and hybrid cars start being widely used, the trend for making those cars is growing around three keywords: safety, convenience, and eco-friendliness.

In general, since most of the electric/electronic parts used in automobiles are impossible to weld, they are fixed/attached using adhesives or adhesive sheets. Conventionally, adhesives used in automobiles include epoxy, urethane, polyisobutylene (PIB), and paraxylene, etc., and the application method is generally gluing, sealing, coating, and molding, etc. Epoxy is used to bond various substrates and is cured at the room temperature or accelerated cured at the heating condition. Epoxy, however, generally has limitation for a long-term use at the high temperature. Epoxy is also opaque and resistant to wear, moisture, and chemicals, but like other hard coatings, it does not absorb the stress resulting from the different degree of thermal expansion between components, circuits, and substrates, but even rather increases the stress at the extreme temperature or thermal cycles. In addition, urethane is able to adhere to a variety of substrates and has a wide range of elastic modulus after curing, but when the urethane is used for metal adhesion, often primers are required to be applied for the adhesion. As a result, the urethane is limitedly used because it is less stable under the high humid condition. Moreover, for polyisobutylene, like the urethane, it adheres to various substrates after curing and has a wide range of elastic modulus, but is less stable for solvents, oils, fuels, and chemicals. For para-xylene, it is advantageous to be used for conformal coating because it maintains a constant coating thickness and has good permeability to complex structures. However, its application is limited because it has relatively high price and high sensitivity to contamination and also is to crack due to vibration thereby required to be used under the vacuum condition.

Thus, embodiments of the present invention provides an adhesive sheet comprising an adhesive material.

The adhesive sheet according to one embodiment of the present invention utilizes an acrylic resin composition without using a separate primer layer. As a result, one embodiment of the present invention can provide excellent adhesion, high reliability due to its excellent light resistance under the sunlight exposure, and excellent elastic modulus. Therefore, it can be easily used as an adhesive material in various fields such as building materials and automobiles.

Details of embodiments of the present invention will be described in the following.

In one embodiment, embodiments of the present invention provide an adhesive sheet including an adhesive layer formed of a resin composition. The adhesive sheet according to one embodiment of the present invention includes an adhesive layer formed of an acrylic resin composition because it is economical in raw materials, exhibits excellent adhesion to various substrates, is capable of accelerated curing, and forms a hard cured layer and thus exhibits excellent wear resistance.

In this case, the resin composition is a composition containing 50% or more of the acrylic monomer in the composition, alkyl (meth) acrylate having a straight or a branched chain alkyl group having 1 to 10 carbon atoms; hydroxyl group-containing monomers; and an aliphatic saturated hydrocarbon ring-containing monomer having 4 to 20 carbon atoms, and together with the monomers, may include a UV absorber and a photopolymerization initiator.

Specifically, the alkyl (meth) acrylate may be alkyl (meth) acrylate or alkoxy alkyl (meth) acrylate having a straight or a branched chain alkyl group having 1 to 10 carbon atoms where "(meth) acrylate" can be acrylate and/or methacrylate. Such alkyl (meth) acrylates may have, for example, one or more elements selected from a group including n-butyl acrylate, iso-butyl acrylate, pentyl acrylate, hexyl acrylate, 2-ethylhexyl acrylate, iso-octyl acrylate, n-nonyl (meth) acrylate, iso-nonyl acrylate, n-decyl (meth) acrylate and iso-decyl (meth) acrylate. Specifically, the alkyl (meth) acrylate further includes 2-ethylhexyl acrylate having 4 to 8 carbon atoms. One embodiment of the present invention includes the alkyl (meth) acrylate for the resin composition thereby optimizing the elastic force at −10° C.~0° C. threalizing a high transparency in the adhesive sheet and at the same time improving the wetting and initial adhesion of the adhesive sheet.

The hydroxyl group-containing monomer is an acrylic monomer containing a hydroxyl group (OH group) as a reactive functional group. The hydroxyl group-containing monomer may have, for example, one or more elements selected from a group including 2-hydroxyethyl (meth) acrylate, 2-hydroxypropyl (meth) acrylate, 4-hydroxybutyl (meth) acrylate, 6-hydroxyhexyl (meth) acrylate, 8-hydroxyoctyl (meth) acrylate, 2-hydroxyethylene glycol (meth) acrylate and 2-hydroxypropylene glycol (meth) acrylate, and specifically it may further includes 2-hydroxyethyl (meth) acrylate.

The hydroxyl group-containing monomer content may be 45 to 90 parts by weight based on 100 parts by weight of the alkyl (meth) acrylate, specifically 45 to 85 parts by weight, 45 to 80 parts by weight, 45 to 75 parts by weight, and 45 to 70 parts by weight, 45 to 65 parts by weight, 45 to 60 parts by weight, 45 to 50 parts by weight, 50 to 90 parts by weight, 60 to 90 parts by weight, 45 to 75 parts by weight, 45 to 65 parts by weight, 55 to 65 parts by weight, 57 to 68 parts by weight, 59 to 64 parts by weight, 52 to 63 parts by weight, 56 to 62 parts by weight, 57 to 64 parts by weight, or 58 to 62 parts by weight.

In addition, the aliphatic saturated hydrocarbon ring-containing monomer is a (meth) acrylate having an aliphatic saturated hydrocarbon ring and it may have one or more elements selected from a group including isobornyl (meth) acrylate, cyclohexyl (meth) acrylate, norbornanyl (norbornanyl) (meth) acrylate, norbornenyl (meth) acrylate, dicyclopentadienyl (meth) acrylate, ethynylcyclohexane (meth) acrylate, and ethynylcyclohexene (meth) acrylic, and specifically, it may further includes isobornyl (meth) acrylate.

In this case, the content of the aliphatic saturated hydrocarbon ring-containing monomer may be 45 to 110 parts by weight based on 100 parts by weight of alkyl (meth) acrylate, specifically 45 to 100 parts by weight, 45 to 90 parts by weight, 45 to 80 parts by weight, 45 to 70 parts by weight, 45 to 50 parts by weight, 50 to 100 parts by weight, 50 to 80 parts by weight, 50 to 70 parts by weight, 55 to 65 parts by weight, 57 to 62 parts by weight, 75 to 100 parts by weight, 100 to 110 parts by weight, 58 to 92 parts by weight, 70 to 110 parts by weight, 80 to 100 parts by weight, 85 to 95 parts by weight, 87 to 93 parts by weight, or 55 to 95 parts by weight.

Furthermore, the acrylic resin composition according to one embodiment of the present invention may include a UV absorber and a photopolymerization initiator together with the acrylic monomer described above.

Specifically, the resin composition may comprise the UV absorber having one or more elements selected from a group including a benzophenone compound, an oxalanilide compound, a benzotriazole compound and a triazine compound. As one example, the resin composition may include a tris-resorcinol-triazine derivative, which is a triazine compound, as a UV absorber. In addition, the amount of the UV absorber can be 10 to 50 parts by weight based on 100 parts by weight of alkyl (meth) acrylate, specifically, 10 to 40 parts by weight, 10 to 30 parts by weight, 20 to 40 parts by weight, 30 to 45 parts by weight, 10 to 25 parts by weight, 10 to 20 parts by weight, 15 to 30 parts by weight, 20 to 30 parts by weight, 28 to 35 parts by weight, 35 to 42 parts by weight, 43 to 49 parts by weight, 15 to 25 parts by weight, 10 to 22 parts by weight, 14 to 23 parts by weight, 16 to 25 parts by weight, 18 to 27 parts by weight, 19 to 26 parts by weight, 16 to 24 parts by weight, 18 to 22 parts by weight, or 19 to 21 parts by weight. Embodiments of the present invention can effectively block ultraviolet rays without having a separate UV blocking layer in an adhesive sheet by controlling the type and content of the UV absorber as described above, so that the thickness of the adhesive sheet can be reduced, and the light transmittance and light resistance of the adhesive sheet are improved. Furthermore, it is possible to improve the reliability against the exposure to the sunlight.

In addition, the acrylic resin composition comprises the photo polymerization initiator having one or more elements selected from a group including 1-hydroxy cyclohexyl phenyl ketone, 2,2-dimethoxy-2-phenyl acetophenone, 2-hydroxy-2-methyl-1-phenyl-propan-1-one, 2-Methyl-1-[4-(methylthio) phenyl]-2-morpholinopropan-1-one, 2-benzyl-2-dimethylamino-1-(4-morpholinophenyl)-butan-1-one, 2-chlorothioxanthone, 2,4-dimethylthioxanthone, 2,4-diisopropylthioxanthone, isopropyl thioxanthone, 2,4,6-trimethylbenzoyl diphosphine oxide, and bis ((2,6-dimethoxybenzoyl)-2,4,4-trimethylpentyl phosphine oxide. The content of the photopolymerization initiator can be 5 parts by weight or less based on 100 parts by weight of alkyl (meth) acrylate, specifically, 4 parts by weight or less, 3 parts by weight or less, 0.01 to 3 parts by weight, 0.01 to 2 parts by weight, 0.01 to 4 parts by weight, 0.1 to 5 parts by weight, 0.5 to 5 parts by weight, 1 to 4 parts by weight, 2 to 4 parts by weight or 2.5 to 3.5 parts by weight. Embodiments of the present invention can prevent insufficient adhesion force caused by the low degree of polymerization of the resin composition by controlling the content of the photopolymerization initiator in the above-described range.

Furthermore, the resin composition may further include one or more elements selected from a group including the amide-containing monomers and the aromatic ring-containing monomers.

Here, the amide-containing monomer may include one or more elements selected from a group including N, N-dimethylacrylamide (DMAA), N, N-diethylacrylamide, and N, N-dimethylmethacrylamide. And specifically N, N-dimethylacrylamide (DMAA).

Further, the aromatic ring-containing monomers may include one or more elements selected from a group including gphenoxyethyl (meth) acrylate, benzyl (meth) acrylate, phenoxydiethylene glycol (meth) acrylate, ethylene oxide modified phenoxy nonyl (meth) acrylate, and ethylene oxide (meth) acrylate-modified cresol, and may specifically include phenoxyethyl (meth) acrylate.

In addition, the content of the amino-containing monomer and/or the aromatic ring-containing monomer may be 1 to 50 parts by weight based on 100 parts by weight of alkyl (meth) acrylate, specifically 1 to 45 parts by weight, 1 to 40 parts by weight, 1 to 35 parts by weight, 1 to 30 parts by weight, 1 to 25 parts by weight, 1 to 20 parts by weight, 1 to 15 parts by weight, 1 to 10 parts by weight, 1 to 5 parts by weight, 5 to 50 parts by weight, 10 to 50 parts by weight, 20 to 50 parts by weight, 25 to 50 parts by weight, 30 to 50 parts by weight, 10 to 30 parts by weight, 20 to 40 parts by weight, 20 to 30 parts by weight, 22 to 26 parts by weight, 24 to 29 parts by weight, 15 to 25 parts by weight, 10 to 20 parts by weight, 6 to 15 parts by weight, 4 to 13 parts by weight, 8 to 12 parts by weight, 5 to 10 parts by weight or 18 to 25 parts by weight.

In addition, the acrylic resin composition may further include any one or more of a silane coupling agent and a crosslinking agent.

Specifically, the silane coupling agent may have one or more elements selected from the group including γ-glycidoxy propyltrimethoxysilane, γ-glycidoxy propyltriethoxysilane, γ-aminopropyltrimethoxysilane, and N-phenyl-aminopropyltrimethoxysilane Furthermore, the crosslinking agent is a compound containing two or more polymerizable functional groups and may have one or more polyfunctionalacrylates selected from the group including dipentaerythritol hexaacrylate, tetramethylolmethane tetraacrylate, tetramethylolmethane triacrylate, trimethanolpropane triacrylate, 1,6-bis (3-acryloyloxy-2-hydroxypropyloxy) hexane, poly (ethylene glycol) diacrylate (PEGDA) and pentaerythritol triacrylate. Embodiments of the present invention can be used to control the elastic modulus of the adhesive sheet appropriately by using the compound selecting from an acrylate group as two or more polymerizable functional groups not from a hydroxyl group for a crosslinking agent thereby optimizing the adhesive strength and weather resistance of the adhesive sheet.

Here, the content of the silane coupling agent and/or the crosslinking agent may be 5 parts by weight or less based on 100 parts by weight of the alkyl (meth) acrylate, and specifically 4 parts by weight or less, 3 parts by weight or less, 2 parts by weight or less, 1 weight part or less, 0.01 to 5 parts by weight, 0.01 to 4 parts by weight, 0.01 to 3 parts by weight, 0.01 to 2 parts by weight, 0.01 to 1 parts by weight, 0.5 to 1 parts by weight, 1 to 3 parts by weight, 2 to 4 parts by weight, 3 to 5 parts by weight, 0.5 to 2 parts by weight, 0.1 to 2 parts by weight, 0.1 to 1.6 parts by weight, 0.1 to 1.4 parts by weight, 0.1 to 1.2 parts by weight, 0.1 to 1.1 parts by weight, 0.1 to 0.8 parts by weight, 0.1 to 0.6 parts by weight, 0.1 to 0.5 parts by weight, 0.1 to 0.4 parts by weight, 0.1 to 0.3 parts by weight, 0.8 to 1.2 parts by weight, 0.9 to 1.3 parts by weight, 0.4 To 0.7 parts by weight or 0.8 to 1.7 parts by weight. Embodiments of the present invention can improve the adhesion stability of the adhesive sheet by controlling the type and the content of the silane coupling agent and/or the crosslinking agent as described above to improve the reliability under high temperature and high humidity.

Embodiments of the present invention can improve the adhesion, elastic modulus and light resistance of the adhesive sheet and also provide the adhesive sheet having excellent adhesion, durability, and reliability by forming the adhesive layer with the acrylic resin composition having the monomer component and content as described above.

As one example, the loss elastic modulus of the adhesive sheet may satisfy the following Equation 1:

$$|\log LM_{-10°\,C.} - \log LM_{0°\,C.}| \le 0.600 \qquad \text{Equation 1}$$

wherein a log $LM_{-10°\,C.}$ is a log value of said loss elastic modulus measured at a rate of 5° C./min of under a condition of −10° C. 1 Hz, and 1% strain, and a log $LM_{0°\,C.}$ is a log value of said loss elastic modulus measured at a rate of 5° C./min under a condition of at 0° C. 1 Hz and 1% strain.

Specifically, the loss elastic modulus of the adhesive sheet satisfies the Equation 1 by having the value of 0.500, 0.400 or less, 0.300 or less, 0.200 or less, 0.001 to 0.150, 0.001 to 0.100, 0.010 to 0.030, 0.010 to 0.100, 0.100 to 0.500, 0.200 to 0.400, or 0.037 to 0.410.

Moreover, the adhesive sheet may have a storage elastic modulus of 0.25 MPa to 0.65 MPa at 25° C. and 1 Hz, and more specifically, its storage elastic modulus can be 0.25 MPa to 0.60 MPa, 0.25 MPa to 0.50 MPa, 0.25 MPa to 0.40 MPa, and 0.25 MPa to 0.35 MPa, 0.25 MPa to 0.30 MPa, 0.25 MPa to 0.28 MPa, 0.27 MPa to 0.34 MPa 0.28 MPa to 0.38 MPa, 0.35 MPa to 0.42 MPa, 0.55 MPa to 0.62 MPa, 0.58 MPa to 0.64 MPa, 0.51 MPa to 0.60 MPa or 0.27 MPa to 0.32 MPa.

The adhesive sheet according to one embodiment of the present invention can minimize the stress caused by shock, vibration or heat transmitted from the outside by controlling the loss elastic modulus and storage elastic modulus at a specific temperature (−10° C.~0° C.) condition as described above. As a consequence, durability can be effectively improved.

As another preferred embodiment, the adhesive sheet has excellent light transmittance for visible light, and the average light transmittance in the range of the wavelength of the light between 400 nm to 750 nm may be 80% or more, 85% or more, 90% or more, or 90% to 95%. Moreover, haze can be less than 5.0%, less than 4.0%, less than 3.0%, less than 2.5%, less than 1.0%, less than 0.5%, 0.1 to 3.0%, 0.1 to 2.0%, 0.1 to 1.0%, 0.1 to 0.5% or 0.1 to 0.3%. In addition, the adhesive sheet contains a specific UV absorber and has excellent UV blocking effect, and may exhibit a specific color coordinate when measuring the CIE color coordinate for the adhesive sheet. For example, the adhesive sheet may have an average light transmittance of 10% or less in the UV range of 300 nm to 400 nm, and more specifically it can be 9% or less, 8% or less, 7% or less, 6% or less, or 5% or less. Furthermore, the adhesive sheet may have a value of b* being 6 to 8 when measuring the CIE color coordinates, and specifically the b* value can be 6 to 7.5, 6.5 to 8, 6.5 to 7.5, 6.4 to 7.3, 6.2 to 7.1, 6.6 to 7.9, 6.7 to 7.2, 6.8 to 7.1 or 6.85 to 7.05. In addition, the adhesive sheet may be light-resistant due to the UV absorber, thus the degree of change in the light transmittance of the adhesive sheet may be insignificant even after exposure to the sunlight. For example, the adhesive sheet may have a light transmittance at the wavelength of 450 nm to satisfy the following Equation 2 even after being exposed to sunlight.

$$T_{0d} - T_{10d} \leq 1\%, \quad \text{Equation 2}$$

$T_{0d}$ is the light transmittance of the adhesive sheet not exposed to sunlight, and $T_{10d}$ is the light transmittance of the adhesive sheet exposed to sunlight at 85° C. for 10 days.

Specifically, the adhesive sheet has a light transmittance difference ($T_{0d} - T_{10d}$) of 1% or less, 0.9 or less, 0.8% or less, 0.7% or less 0.6% or less, 0.5% or less, 0.4% or less, 0.2% or less, 0.1% or less, 0.001% to 1.0%, 0.001% to 0.9%, 0.001% to 0.7%, 0.001% to 0.5%, 0.001% to 0.2%, 0.001% to 0.1%, 0.001% to 0.08%, or 0.001% to 0.05% and those values satisfy the Equation 2. In some cases, there is no light transmittance difference ($T_{0d} - T_{10d}$) thereby 0%, thus it satisfies the Equation 2.

Furthermore, the adhesive sheet has excellent adhesive performance and can provide excellent adhesion even without a separate primer layer to various substrates such as a glass substrate, a polycarbonate substrate, and a polymethyl methacrylate substrate. For example, the adhesive sheet may be used to test a specimen on a transparent substrate (e.g., a glass substrate) at a peel angle of 180° and a tensile speed of 300 mm/min at 23° C. and under 50% RH condition with the average thickness of 250 μm. When peeling to measure the peel adhesive strength, it may exhibit an adhesive strength of 2.8 to 3.6 kgf/25 mm. specifically, the adhesive strength can be 2.9 to 3.6 kgf/25 mm, 2.9 to 3.4 kgf/25 mm, 2.9 to 3.2 kgf/25 mm, 2.8 to 3.0 kgf/25 mm, 2.8 to 3.1 kgf/25 mm, 2.8 to 3.3 kgf/25 mm, 3.0 to 3.5 kgf/25 mm, 3.1 to 3.5 kgf/25 mm, 3.2 to 3.5 kgf/25 mm, 2.85 to 3.25 kgf/25 mm, 2.85 to 3.0 kgf/25 mm, 3.0 to 3.3 kgf/25 mm, 3.0 to 3.15 kgf/25 mm or 3.15 to 3.25 kgf/25 mm.

The adhesive sheet according to one embodiment of the present invention may be protected by a release protective film, a separator or a peeling liner (referred as "protective film") on one side or both sides of the adhesive surface before it is used for automotive electronic parts.

Materials for the protective film can be, for example, a porous film such as plastic film, paper, woven fabric, nonwoven fabric, net, foam sheet, metal foil, laminate, etc., but a plastic film is suitable to use because it has excellent surface smoothness.

Examples of such plastic films include polyethylene films, polypropylene films, polybutene films, polybutadiene films, polymethylpentene films, polyvinyl chloride films, vinyl chloride copolymer films, polyethylene terephthalate films, polybutylene terephthalate films, Polyurethane film, ethylene-vinyl acetate copolymer film, etc. Among them, polyester-based films, such as a polyethylene terephthalate film, a polybutylene terephthalate film, and a polyethylene naphthalate film, are preferable.

The protective film may also be subjected to necessarily anti-static treatment such as release and antifouling treatment with a silicone-based, fluorine-based, long-chain alkyl-based or fatty acid amide-based release agent, silica powder, etc. and necessarily anti-fouling treatment such as a coating type, a dough type and a deposition type. In particular, by appropriately performing peeling treatment such as silicon treatment, long chain alkyl treatment or fluorine treatment on the surface of the protective film, the peelability from the adhesive layer can be further improved.

Furthermore, the adhesive sheet according to one embodiment of the present invention can form an adhesive layer by applying an acrylic resin composition on the protective film and irradiating light to increase the productivity. In this case, the light irradiation may be performed by irradiation for 1 to 10 minutes by ultraviolet radiation having a wavelength of 300 nm to 400 nm and an intensity of 0.5 mW/cm$^2$ to 20 mW/cm$^2$. In particular, for example, the ultraviolet irradiation having the wavelength of 300 nm to 400 nm and the intensity of 0.5 mW/cm$^2$ to 7.0 mW/cm$^2$ for 5±0.5 minutes can be performed to form the adhesive layer.

Moreover, the adhesive sheet may have a suitable thickness to sufficiently provide the physical properties. Specifically, the adhesive sheet may have an average thickness of 100 μm to 1 mm, more specifically, the average thickness can be 100 μm to 1 mm, 200 μm to 1 mm, 250 μm to 1 mm, 500 μm to 1 mm, 750 μm to 1 mm, 100 μm to 500 μm, 300 μm to 600 μm, 100 μm to 300 μm, 150 μm to 300 μm, 180 μm to 350 μm, 110 μm to 220 μm, 190 μm to 210 μm, 180 μm to 270 μm, 200 μm to 300 μm, or 240 μm to 260 μm.

In addition, according to a preferred embodiment of the present invention, it provides an automotive electronic component material comprising an adhesive sheet.

As stated above, the adhesive sheet according to one embodiment of the present invention can have a remarkably excellent adhesive strength without using a separate primer layer by using the acrylic resin composition, and has excellent light resistance and discloses high reliability even when exposed to the sunlight, and has excellent elastic modulus. It is particularly useful as an adhesive material for construction materials and automobiles, as well as for vehicles such as motorcycles, bicycles, ships (e.g. ships, yachts, boats and personal vessels), aircraft and other types of land, sea and air vehicles.

Here, embodiments of the present invention will be described in more detail with reference to embodiments and experiments.

However, the following embodiments and experiments are merely disclosure of the present invention, and the contents of the present invention are not limited to the following embodiments and experiments.

Embodiments 1 to 4

Alkyl (meth) acrylates as shown in Table 1 below; hydroxyl group-containing monomers; aliphatic saturated hydrocarbon ring-containing monomers; amide containing monomers; aromatic ring-containing monomers; UV absorbers; and a photopolymerizationinitiator was added to a four-necked flask, mixed, and then exposed to ultraviolet light under nitrogen atmosphere to obtain a partially polymerized syrup type partial polymer. A silane coupling agent and a crosslinking agent were added to the partial polymer to prepare a resin composition, which was then applied to one surface of a protective film (average thickness: 75 μm), and a protective film was laminated on the coating layer. Then, the laminated sheet laminated in the order of the protective film/resin composition layer/protective film was irradiated by the ultraviolet light with the intensity of 5-20 mW/cm$^2$ and the light amount of 3600 mJ/cm$^2$ to cure the resin composition layer so as to prepare the adhesive sheet (baseless type, the average thickness of the adhesive sheet: 250 μm).

TABLE 1

| Unit (g) | Embodiment1 | Embodiment 2 | Embodiment 3 | Embodiment 4 |
|---|---|---|---|---|
| 2-EHA | 100 | 100 | 100 | 100 |
| IBOA | 60 | 90 | 60 | 60 |
| 2-HEA | 60 | 60 | 60 | 60 |
| DMAA | 10 | 10 | 5 | 10 |
| PHEA | 25 | 25 | 10 | 25 |
| N-6040 | 0.2 | 0.2 | 0.2 | 0.2 |
| PEDGA | 0.5 | 1.5 | 1 | 1 |
| UV Absorber | 20 | 20 | 20 | 20 |
| Omnirad-819 | 3 | 3 | 3 | 3 |

2-EHA: 2-ethylhexyl Acrylate
IBOA: Isobonyl Acrylate
2-HEA: 2-hydroxyethyl Acrylate
DMAA: Dimethyl Acrylamide
PHEA: 2-phenoxyethyl Acrylate
N-6040: Glycidoxy Propyltrimethoxy Silane
PEDGA: Poly(ethylene glycol) Diacrylate
Omnirad-819: 2,4,6-trimethylbenzoyl Diphosphinoxide Comparative Examples 1 to 4

An adhesive sheet was prepared in the same manner as in Embodiment 1 except for adjusting a composition of the resin composition and the average thickness of the adhesive sheet as in Table 2 below.

TABLE 2

| Unit (g) | Comp. Exmp. 1 | Comp. Exmp. 2 | Comp. Exmp. 3 | Comp. Exmp. 4 | Comp. Exmp. 5 |
|---|---|---|---|---|---|
| 2-EHA | 100 | 100 | 100 | 100 | 100 |
| IBOA | 60 | 60 | 60 | 40 | 40 |
| 2-HEA | 60 | 60 | 60 | 40 | 40 |
| DMAA | 10 | 10 | — | — | 10 |
| PHEA | 25 | 25 | — | — | 10 |
| N-6040 | 0.2 | 0.2 | 0.2 | 0.1 | 0.2 |
| PEDGA | 0.5 | 0.5 | 1 | — | — |
| 1,6-HDDA | — | — | — | 0.1 | 0.1 |
| UV Absorber | 20 | — | 20 | — | — |
| Omnirad-184 | — | — | — | 0.3 | 0.3 |
| Omnirad-819 | 3 | 3 | 3 | — | — |
| Avg. Thickness | 100 μm | 250 μm | 250 μm | 250 μm | 250 μm |

2-EHA: 2-ethylhexyl Acrylate
IBOA: Isobonyl Acrylate
2-HEA: 2-hydroxyethyl Acrylate
DMAA: Dimethyl Acrylamide
PHEA: 2-phenoxyethyl Acrylate
N-6040: Glycidoxy Propyltrimethoxy Silane
PEDGA: Poly(ethylene glycol) Diacrylate
1,6-HDAA: 1,6-hexandiol Diacrylate
Omnirad-184: 1-hydroxy Cyclohexyl phenyl Ketone
Omnirad-819: 2,4,6-trimethylbenzoyl Diphosphinoxide Experiments To evaluate the performance of the adhesive sheet according to embodiments of the present invention, the following experiments were carried out.

(A) Light Transmittance Evaluation

One side of a protective film of the adhesive sheet (a layer structure of protective film/adhesive layer/protective film) was removed to expose the adhesive surface, and a glass substrate (average thickness: 0.55T) was bonded to the adhesive sheet to which the adhesive surface was exposed. Then, the remaining protective film of the adhesive sheet was removed to prepare a specimen having a structure of a glass substrate/adhesive layer. The total light transmittance and haze of the prepared specimen were measured with a haze meter (model name: NDH200N) according to ASTM D1003, and the average light transmittance and average haze value for 400 nm to 750 nm wavelength of the light were obtained from the measured results.

(B) Color Coordinate Evaluation

One side of a protective film of the adhesive sheet (a layer structure of protective film/adhesive layer/protective film) was removed to expose the adhesive surface, and a glass substrate (average thickness: 0.55T) was bonded to the adhesive sheet to which the adhesive surface was exposed. Then, the remaining protective film of the adhesive sheet was removed to expose the adhesive surface, and a glass substrate (average thickness: 0.55T) was bonded to the exposed adhesive surface to prepare a specimen. The average color coordinate was obtained by measuring the color coordinates in the CIE color space for the selected points of the prepared specimens.

(C) Adhesion Evaluation

After the adhesive sheet was cut to a width of 25 mm×100 mm in length, one side of a protective film was removed to expose the adhesive surface, and then a PET film having a thickness of 25 m was bonded to the adhesive surface. Subsequently, the remaining protective film of the specimen was removed to expose the adhesive surface, and the specimen with the adhesive surface exposed was placed on a transparent substrate, and then pressed and bonded by reciprocating a 2 kg roller (width: about 50 mm) once. Here, a glass, a polycarbonate substrate (PC), or a polymethyl methacrylate substrate (PMMA) was used as the transparent substrate. Then, the specimen was left for 30 minutes, and the specimen was peeled off from the transparent substrate at a tensile angle of 180° and a tensile speed of 300 mm/min at 23° C. and under 50% RH condition using a tensile tester for measuring a peel adhesion strength (kgf/25 mm).

izing film (POL film) was bonded to the glass substrate (average thickness: 0.55T) to prepare a specimen. The prepared specimens were under an autoclave process for 15 minutes at 0.5 MPa and 50° C. and then left in a high temperature and high humidity chamber at 85° C. and under 85 RH % condition for 24 hours to find whether some degree of bubble generation was visually observed.

TABLE 3

|  |  | Emb. 1 | Emb. 2 | Emb. 3 | Emb. 4 | Comp. Exmp. 1 | Comp. Exmp. 2 | Comp. Exmp. 3 | Comp. Exmp. 4 | Comp. Exmp. 5 |
|---|---|---|---|---|---|---|---|---|---|---|
| Avg. Light Transmittance (400 nm~750 nm) |  | 92.3 | 92.3 | 92.2 | 92.3 | 92.4 | 92.3 | 92.4 | 92.4 | 92.5 |
| Haze[%] |  | 0.21 | 0.20 | 0.20 | 0.21 | 0.20 | 0.18 | 0.19 | 0.18 | 0.15 |
| b* |  | 6.98 | 6.89 | 7.01 | 6.91 | 6.99 | 0.20 | 6.89 | 0.21 | 0.19 |
| Adhesion Strength [kgf/25 mm] | Glass | 3.2 | 3.4 | 3.5 | 3.0 | 2.6 | 3.4 | 3.3 | 2.95 | 4.0 |
|  | PC | 2.9 | 2.7 | 2.7 | 2.9 | 2.8 | 2.8 | 2.8 | 2.89 | 3.2 |
|  | PMMA | 3.1 | 2.6 | 2.8 | 2.8 | 2.7 | 2.8 | 2.9 | 2.77 | 3.2 |
| Loss Elastic Modulus [MPa] | $-10$ | 56 | 28 | 72 | 54 | 57 | 61 | 80 | 25 | 55 |
|  | 05 | 58 | 69 | 30 | 57 | 60 | 58 | 18 | 2.3 | 7.3 |
| Log $LM_{-10° C.}$ − Log $LM_{0° C.}$ |  | −0.0152 | −0.3917 | 0.3796 | −0.0235 | −0.0223 | 0.0219 | 0.6478 | 1.0362 | 0.7719 |
| Storage Elastic Modulus [MPa] |  | 0.29 | 0.59 | 0.26 | 0.33 | 0.30 | 0.29 | 0.22 | 0.1 | 0.14 |
| $T_{0d}$-$T_{10d}$ |  | <0.01 | <0.01 | <0.01 | <0.01 | <0.01 | — | <0.01 | — | — |
| Weather Resistance Evaluation: Finding Bubbles(at high temperature and high humidity conditions)? |  | X | X | X | X | X | X | ○ | ○ | ○ |

(D) Evaluation of Elastic Modulus

The protective film of the adhesive sheet was removed, and three to five layers of adhesive layers were laminated without bubbles to prepare a specimen for measuring elastic modulus of 600 μm to 1,000 μm. Storage elastic modulus (G') and loss elastic modulus (G") were measured in the range of −20° C. to 120° C. using a rheometer (model: ARES G2, manufacturer: TA) at a speed of 5° C./min at a diameter of 8 mm parallel plate, frequency of 1 Hz, and strain of 1%. Among the obtained results, loss elastic modulus and storage elastic modulus at 25° C. are shown in Table 3.

(E) Light Resistance Evaluation

After removing the protective film on both sides of the adhesive sheet, both sides of the adhesive sheet were laminated with a transparent glass substrate (average thickness: 0.55T) to prepare a specimen. After the prepared specimens were under an autoclave process at 0.5 MPa and 50° C. for 15 minutes, the spectral transmittances of the specimens were measured. It was then fixed to a black plate while maintaining at 85±2° C. and exposed to light (power: 830 W/m$^2$) with a solar simulator equipped with a xenon lamp. The spectral transmittance was measured 10 days after the specimen was exposed to light. From the measurement, the light transmittance difference ($T_{0d}$-$T_{10d}$) with the exposure time of sunlight was obtained and the results are shown in Table 3.

(F) Weather Resistance Evaluation

One side of a protective film of the adhesive sheet (a layer structure of protective film/adhesive layer/protective film) was removed to expose the adhesive surface, and a glass substrate (average thickness: 0.55T) was bonded to the adhesive sheet to which the adhesive surface was exposed. Then, the remaining protective film of the adhesive sheet was removed to expose the adhesive surface, and the adhesive was bonded to the exposed adhesive surface so that the hard coating surface of the polarizing film (POL film) made contact with each other and the opposite side of the polar- The adhesive sheet according to embodiments of the present invention discloses excellent elastic modulus, adhesive strength and light resistance because the adhesive sheet includes an adhesive layer formed of a resin composition having a specific component and content.

Specifically, the adhesive sheet of the embodiments of the present invention forms an adhesive layer with a resin composition containing a hydroxyl group-containing monomer, an aliphatic saturated hydrocarbon ring-containing monomer, etc., together with a specific content of an alkyl (meth) acrylate. As a result, the deviation of the loss elastic modulus at −10° C. and 0° C. was found to be 0.600 or less. On contrary, an adhesive sheet not having the monomers stated above or the adhesive sheets of Comparative Examples 3 to 5 using the resin composition having different contents were found to have the loss elastic modulus deviation of more than 0.600 at −10° C. and 0° C.

Such a difference in elastic modulus is related to the adhesion strength and weather resistance of the adhesive sheet. Specifically, the adhesive sheet of Embodiment 1 having a loss elastic modulus deviation of −0.0152 at −10° C. and 0° C. disclosed excellent adhesion regardless of the type of substrate and it was confirmed that no bubbles were generated when evaluating the weather resistance. However, it was confirmed that the adhesive sheets of Comparative Examples 3 to 5 having a loss elastic modulus deviation of 1.0362 at −10° C. and 0° C. were relatively inferior to the adhesive sheet of Embodiment 1 in its adhesive strength and bubbles were generated at high temperature and high humidity conditions.

Moreover, the adhesive sheet of the embodiment containing a certain amount of a specific UV absorber in the adhesive layer showed a b* color coordinate value of 6.5-7.1 in the CIE color coordinates while disclosing the average light transmittance change of the adhesive sheet being less than 0.01 even if irradiated with the light wavelength of 450 nm for 10 days. In contrast, the adhesive sheets of Comparative Examples 2, 4, and 5, which do not contain a certain amount of UV absorber, showed a b* color coordinate value of less than 0.25 while the average light transmittance being remarkably changed by light irradiation at 450 nm wavelength.

From these results, the adhesive sheet according to embodiments of the present invention can provide an excellent adhesive strength even without using a separate primer layer because it includes an adhesive layer formed of a resin composition having a specific type and content. Furthermore, it is understood that the adhesive sheet in the present invention has characteristics of excellent light resistance, high reliability and durability even when exposed to sunlight, and excellent the elastic modulus.

What is claimed is:

1. An adhesive sheet comprising:
an adhesive layer formed of a resin composition and
a loss elastic modulus of said adhesive sheet satisfying an Equation 1:

$$|\log LM_{-10°\ C.} - \log LM_{0°\ C.}| \leq 0.600$$

wherein a log $LM_{-10°\ C.}$ is a log value of said loss elastic modulus measured at a rate of 5° C./min of under a condition of −10° C., 1 Hz, and 1% strain, and a log $LM_{0°\ C.}$ is a log value of said loss elastic modulus measured at a rate of 5° C./min under a condition of at 0° C., 1 Hz and 1% strain, and
wherein the resin composition includes:
(a) 100 parts by weight of an alkyl (meth) acrylate having a straight or a branched chain alkyl group having 1 to 10 carbon atoms;
(b) 58 to 62 parts by weight of hydroxyl-containing monomers;
(c) 70 to 110 parts by weight of an aliphatic saturated hydrocarbon ring-containing monomer having 4 to 20 carbon atoms;
(d) 28 to 35 parts by weight of a UV absorber; and
(e) 5 parts by weight or less of a photo polymerization initiator.

2. The adhesive sheet of claim 1, wherein an average light transmittance of a light transmitting through said adhesive sheet is 10% or less, and
wherein a range of a wavelength of said light is 300 nm to 400 nm.

3. The adhesive sheet according to the claim 1, wherein said loss elastic modulus is 0.25 MPa to 0.65 MPa measured at 25° C. and 1 Hz.

4. The adhesive sheet of claim 1, wherein said alkyl (meth) acrylates has one or more elements selected from the group consisting of an n-butyl acrylate, an iso-butyl acrylate, a pentyl acrylate, a hexyl acrylate, a 2-ethylhexyl acrylate (2-EHA), an iso-octyl acrylate, an n-nonyl (meth) acrylate, an iso-nonyl acrylate, an n-decyl (meth) acrylate and an iso-decyl (meth) acrylate.

5. The adhesive sheet of claim 1, wherein said hydroxyl-containing monomers has one or more elements selected from the group consisting of a 2-hydroxyethyl (meth) acrylate (2-HEA), a 2-hydroxypropyl (meth) acrylate, a 4-hydroxybutyl (meth) acrylate, a 6-hydroxyhexyl (meth) acrylate, an 8-hydroxyoctyl (meth) acrylate, a 2-hydroxyethylene glycol (meth) acrylate and a 2-hydroxypropylene glycol (meth) acrylate.

6. The adhesive sheet of claim 1, wherein said aliphatic saturated hydrocarbon ring-containing monomer has one or more elements selected from the group consisting of an isobornyl (meth) acrylate, a cyclohexyl (meth) acrylate, a norbornanyl (meth) acrylate, a norbornenyl (meth) acrylate, a dicyclo pentadienyl (meth) acrylate, an ethynylcyclohexane (meth) acrylate, and an ethynylcyclohexene (meth) acrylate.

7. The adhesive sheet of claim 1, wherein said photo polymerization initiator has one or more elements selected from the group consisting of a 1-hydroxy cyclohexyl phenylketone, a 2,2-dimethoxy-2-phenyl acetophenone, a 2-hydroxy-2-methyl-1-phenyl-propan-1-one, a 2-methyl-1-[4-(methylthio) phenyl]-2-morpholinopropane-1-one, a 2-benzyl-2-dimethyl amino-1-(4-morpholinophenyl)-butan-1-one, a 2-chlorothioxanthone, a 2,4-dimethylthioxanthone, a 2,4-diisopropylthioxanthone, an isopropyl thioxanthone, a 2,4,6-trimethylbenzoyl diphosphine oxide and a bis ((2,6-dimethoxybenzoyl)-2,4,4-trimethylpentyl) phosphine oxide.

8. The adhesive sheet of claim 1, wherein said UV absorber has one or more elements selected from the group consisting of a benzophenone compound, an oxalanilide compound, a benzotriazole compound and a triazine compound.

9. The adhesive sheet of claim 1, wherein said resin composition has one or more elements selected from the group consisting of an amide containing monomer and an aromatic ring containing monomer.

10. The adhesive sheet of claim 9, wherein a content of the amide-containing monomer or the aromatic ring-containing monomer is 1 to 50 parts by weight based on 100 parts by weight of said alkyl (meth) acrylate.

11. The adhesive sheet of claim 9, wherein said amide containing monomer has one or more elements selected from the group consisting of an N, N-dimethylacrylamide, an N, N-diethylacrylamide, and an N, N-dimethylmethacrylamide.

12. The adhesive sheet of claim 9, wherein said aromatic ring containing monomer has one or more elements selected from the group consisting of a phenoxyethyl (meth) acrylate, a benzyl (meth) acrylate, a phenoxydiethylene glycol (meth) acrylate, an ethylene oxide modified phenoxy nonyl (meth) acrylate, and an ethylene oxide (meth) acrylate modified cresol.

13. The adhesive sheet of claim 1, wherein said resin composition has one or more of a silane coupling agent and a crosslinking agent.

14. The adhesive sheet of claim 13, wherein said silane coupling agent has one or more elements selected from the group consisting of a γ-glycidoxy propyltrimethoxysilane, a γ-glycidoxy propyltriethoxysilane, a γ-aminopropyltrimethoxysilane, and an N-phenyl-aminopropyltrimethoxysilane.

15. The adhesive sheet of claim 13, wherein said crosslinking agent has one or more multifunctional acrylate elements selected from the group consisting of a dipentaerythritol hexaacrylate, a tetramethylolmethane tetraacrylate, a tetramethylolmethane triacrylate, a trimethanolpropane triacrylate, a 1,6-bis (3-acryloyloxy-2-hydroxypropyloxy) hexane, a poly (ethylene glycol) diacrylate (PEGDA) and a pentaerythritol triacrylate.

16. The adhesive sheet of claim 1, wherein an average thickness of said adhesive sheet is 100 μm to 1 mm.

17. The adhesive sheet of claim 1, wherein a coordinate value of b* is 6 to 8 when a CIE color coordinate is measured.

* * * * *